United States Patent
Grubbs, Jr.

(10) Patent No.: US 10,682,828 B2
(45) Date of Patent: Jun. 16, 2020

(54) STRETCH WRAP FILM AND ITS METHOD OF PRODUCTION

(71) Applicant: Ronald Grubbs, Jr., Charlotte, NC (US)

(72) Inventor: Ronald Grubbs, Jr., Charlotte, NC (US)

( * ) Notice: Subject to any disclaimer, the term of this patent is extended or adjusted under 35 U.S.C. 154(b) by 545 days.

(21) Appl. No.: 15/141,479

(22) Filed: Apr. 28, 2016

(65) Prior Publication Data
US 2017/0313020 A1 Nov. 2, 2017

(51) Int. Cl.
*B32B 27/00* (2006.01)
*B32B 38/00* (2006.01)
(Continued)

(52) U.S. Cl.
CPC ............... *B32B 3/085* (2013.01); *B32B 3/04* (2013.01); *B32B 7/14* (2013.01); *B32B 27/08* (2013.01); *B32B 27/32* (2013.01); *B32B 37/14* (2013.01); *B32B 38/18* (2013.01); *B32B 2250/02* (2013.01); *B32B 2250/242* (2013.01); *B32B 2255/10* (2013.01); *B32B 2553/00* (2013.01); *Y10T 156/101* (2015.01); *Y10T 156/1011* (2015.01); *Y10T 156/1015* (2015.01); *Y10T 156/1043* (2015.01); *Y10T 156/1051* (2015.01); *Y10T 156/1067* (2015.01); *Y10T 156/1069* (2015.01); *Y10T 156/1074* (2015.01); *Y10T 156/1085* (2015.01); *Y10T 156/125* (2015.01); *Y10T 156/13* (2015.01);
(Continued)

(58) Field of Classification Search
CPC ........... Y10T 156/101; Y10T 156/1011; Y10T 156/1015; Y10T 156/1043; Y10T 156/1051; Y10T 156/125; Y10T 156/13; Y10T 156/1322; Y10T 156/1067; Y10T 156/1069; Y10T 156/1085; Y10T 156/1087; Y10T 156/1727; Y10T 156/1798; Y10T 156/1074; B32B 38/0004; B32B 38/04; B32B 38/10; B32B 38/1808; B32B 2038/045; B32B 37/0038; B32B 37/1246; B32B 37/1284; B32B 37/14; B32B 37/144; B32B 3/04; B32B 7/14; B32B 3/083
See application file for complete search history.

(56) References Cited

U.S. PATENT DOCUMENTS 4,588,463 A * 5/1986 Barber ................. B31F 1/0029
156/200

* cited by examiner

*Primary Examiner* — Linda L Gray
(74) *Attorney, Agent, or Firm* — Blake E. Vande Garde; Erickson Kernell IP, LLC (57) ABSTRACT

A reinforced stretch film obtained by a method of producing a reinforced stretch film comprising the steps of: providing an elongated base sheet of plastic stretch film having a longitudinal axis, forming a plurality of cord-like, elongated reinforcement members and a plurality of plastic film strip overlays, positioning the plurality of elongated reinforcement members on the elongated base sheet, positioning a single plastic film strip overlay over each of the elongated reinforcement members, folding each edge of the elongated base sheet inward toward a center of the elongated base sheet to further strengthen and reinforce each edge and attaching the plastic film strip overlays and the folded edges to the cord-like, elongated reinforcement members and to the elongated base sheet to fixedly sandwich the cord-like, elongated reinforcement members between the elongated base sheet and the narrow plastic film strip overlays.

9 Claims, 4 Drawing Sheets

(51) Int. Cl.
*B32B 3/00* (2006.01)
*B32B 7/00* (2019.01)
*B32B 3/08* (2006.01)
*B32B 7/14* (2006.01)
*B32B 3/04* (2006.01)
*B32B 27/08* (2006.01)
*B32B 27/32* (2006.01)
*B32B 37/14* (2006.01)
*B32B 38/18* (2006.01)

(52) U.S. Cl.
CPC .... *Y10T 156/1322* (2015.01); *Y10T 156/1727* (2015.01); *Y10T 156/1798* (2015.01)

STRETCH WRAP FILM AND ITS METHOD OF PRODUCTION

FIELD OF INVENTION

The instant invention relates to a method for producing plastic film, more particularly reinforced stretch film or plastic films used for stretch wrapping, and even more particularly, reinforced stretch film employed in pallet wrapping and other applications. The invention also encompasses the reinforced stretch film.

BACKGROUND OF THE INVENTION

Stretch films are well known and such films are commonly employed, for example, to wrap goods and products of various types positioned on a pallet, the film wholly or partially covering the goods or products and also typically applied to the pallet itself to secure the pallet to the items positioned thereon. The films themselves are typically made of polyethylene, although other stretch film sheet materials can be employed as well.

To reduce packaging costs, it may be desired to use as little stretch film as possible. In addition, to reduce shipping costs by keeping the shipping weight as low as possible and minimizing the space required for shipping, it may be desired for the film to be as light weight and as thin as possible. However, for obvious safety concerns of both the product being shipped and the humans and equipment used in shipping, stretch films need to have high strength. These problems are all interrelated as typically the less film you use, or the lighter and thinner the stretch film is, the less strength it will have. This is especially true for heavier loads (like bricks, cement blocks, bags, drums, steel tubes, pipes etc.) where stretch films are being continuously wrapped around the pallets to achieve load retention. Currently, the safety concerns are strong enough that the stretch film has to be wrapped with heavier gauge material, like straps, bags or stretch hoods, or an immense amount of film with low pre-stretch is used to keep the heavy product secure. However, both of these options clearly increase packaging and/or shipping costs.

Thus, there is clearly a need to create a light weight thin stretch film that has high strength and can create a high force to load. The instant invention is designed to provide a reinforced stretch film that addresses at least some of the above mentioned problems.

SUMMARY OF THE INVENTION

The instant invention is directed toward a reinforced stretch film and its method of production. The method of producing the reinforced stretch film includes the steps of: providing an elongated base sheet of plastic stretch film having a longitudinal axis; forming a plurality of cord-like, elongated reinforcement members from a sheet of plastic stretch film other than the elongated base sheet; forming a plurality of plastic film strip overlays from a sheet of plastic stretch film other than the elongated base sheet; positioning the plurality of cord-like, elongated reinforcement members to the elongated base sheet where the cord-like, elongated reinforcement members extend along the longitudinal axis of the elongated base sheet; positioning a plurality of plastic film strip overlay over each of the cord-like, elongated reinforcement members where the plastic film strip overlays being parallel and spaced from one another; folding each edge of the elongated base sheet of plastic stretch film inward toward a center of the elongated base sheet to further strengthen and reinforce each edge; and attaching the plastic film strip overlays and/or the folded edges to the cord-like, elongated reinforcement members and to the elongated base sheet to fixedly sandwich the cord-like, elongated reinforcement members between the elongated base sheet and the narrow plastic film strip overlays. Whereby, the narrow plastic film strip overlays, the folded edges and the cord-like, elongated reinforcement members comprising parallel, elongated reinforcement strips defining elongated spaces therebetween.

The reinforced stretch film includes the elongated base sheet and the plurality of elongated reinforcement strips. The elongated base sheet is made of plastic stretch film and has a longitudinal axis. The plurality of elongated reinforcement strips extend along the longitudinal axis of the elongated base sheet, are disposed substantially parallel to one another, and define elongated spaces therebetween. Each elongated reinforcement strip includes: a cord-like, elongated reinforcement member made from a sheet of plastic stretch film other than the elongated base sheet attached to the elongated base sheet and extending along the longitudinal axis of the elongated base sheet and a narrow plastic film strip overlay made from a sheet of plastic stretch film other than the elongated base sheet positioned over the cord-like, elongated reinforcement member. The reinforcement members are attached to the elongated base sheet and extend along the longitudinal axis of the base sheet. Each of the narrow plastic film strip overlays are positioned over the cord-like, elongated reinforcement members thereof. Each edge of the elongated base sheet of plastic stretch film is folded inward, and over at least one cord-like elongated reinforcement member to further strengthen and reinforce each edge. The narrow plastic film strip overlay and each edge may be attached to the cord-like, elongated reinforcement member and to the elongated base sheet at opposed sides of the cord-like, elongated reinforcement member to fixedly sandwich the cord-like, elongated reinforcement member between the elongated base sheet and the narrow plastic film strip overlay.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 1 is a schematic perspective view of one embodiment of an apparatus carrying out one embodiment of the method of the present invention when producing the reinforced stretch film of the instant invention.

FIG. 2 is a schematic perspective view of one embodiment of an apparatus carrying out one embodiment of the method of the present invention when producing the reinforced stretch film of the instant invention.

FIG. 3 is an environmental perspective view of one embodiment of the reinforced stretch film being wrapped around a pallet through use of a stretch wrapping machine.

FIG. 4 is another environmental perspective view of one embodiment of the reinforced stretch film being wrapped around a pallet through use of a stretch wrapping machine.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring to the drawings, wherein like numerals, indicate like elements, there is shown in the Figures an embodiment of a reinforced stretch film 1 (see FIGS. 1-4). Reinforced stretch film 10 may be used for wrapping heavy materials onto a pallet 62. The heavy material may be any material desired to be wrapped on pallet 62, including, but not limited to, heavier pallet materials like bricks, cement blocks, bags, drums, steel tubes, pipes, other similar materials, etc. Reinforced stretch film 10 may provide a high strength, tear resistant stretch film that is capable of securing such heavy materials onto pallet 62. Reinforced stretch film 10 may allow a user to wrap such heavy materials onto pallet 62 safely and securely with less material, weight and space without the need for heavier gauge material, like straps, bags or stretch hoods, or an immense amount of film. Reinforced stretch film 10 may generally be comprised of a base sheet of plastic film 20 and a plurality of reinforcement strips 50 attached to the base sheet 20. These components and the method of producing the reinforced stretch film 10 are discussed in further detail below.

One embodiment of the instant invention discloses a reinforced stretch film 10 obtained by a method of producing a reinforced stretch film 10 comprising the steps of:

(a) providing an elongated base sheet 20 of plastic stretch film having a longitudinal axis;

(b) forming a plurality of cord-like, elongated reinforcement members 35 from a sheet of plastic stretch film other than the elongated base sheet 20;

(c) forming a plurality of plastic film strip overlays 40 from a sheet of plastic stretch film other than the elongated base sheet 20;

(d) positioning the plurality of cord-like, elongated reinforcement members 35 on the elongated base sheet 20 where the cord-like, elongated reinforcement members 35 extending along the longitudinal axis of the elongated base sheet 20;

(e) positioning a single plastic film strip overlay 40 over each of the cord-like, elongated reinforcement members 35 where the plastic film strip overlays 40 are parallel and spaced from one another;

(f) folding each edge 25 of the elongated base sheet 20 of plastic stretch film inward toward a center of the elongated base sheet 20 to further strengthen and reinforce each edge 25; and (g) attaching the plastic film strip overlays 40 and the folded edges 28 to the cord-like, elongated reinforcement members 35 and to the elongated base sheet 20 to fixedly sandwich the cord-like, elongated reinforcement members 35 between the elongated base sheet 20 and the narrow plastic film strip overlays 40, whereby, the plastic film strip overlays 40, the folded edges 28 and the cord-like, elongated reinforcement members 35 are parallel, elongated reinforcement strips 50 which define elongated spaces 52 therebetween and wherein the stretch percent of the reinforced stretch film 10 is increased over the stretch percent of the elongated base sheet 20 of plastic stretch film.

The above method may further include the reinforced stretch film 10 further comprising a plurality of slits through the elongated base sheet 20, the reinforcement strips 50, the folded edges 28, or a combination thereof, which expand into holes when stretched making the reinforced stretch film ventilated. In another embodiment, the above method may further include pre-stretching the reinforced stretch film 10, the elongated base sheet 20, the master material 30 the reinforcement member(s) 35, the overlay(s) 40, the reinforcement strip(s) 50, or a combination thereof. Pre-stretching may be achieved by any means known in the art. In one embodiment of the above method, the pre-stretching may be achieved by passing the above materials through a device in which the level of pre-stretch is adjusted by altering the transmission ratio of two or more power transmission gears operationally associated with a first pre-stretching roller and a second pre-stretching roller, wherein the level of pre-stretch is achieved by passing the materials over the rollers while set at a desired gear ratio.

The elongated base sheet 20 may have a longitudinal axis and be made of any suitable material for a stretch film, including any suitable plastic stretch films. See FIGS. 1-4. In one embodiment, the base sheet 20 may be made from a polyethylene material, including, but not limited to linear low-density polyethylene, also known as LLDP. The plurality of reinforcement strips 50 may extend along the longitudinal axis of base sheet 20. In one embodiment, the reinforcement strips 50 may be disposed substantially parallel to one another, and define elongated spaces 52 therebetween. In one embodiment, the base sheet 20 may be uncovered in the elongated spaces 52 defined between reinforcement strips 50.

Each of the elongated reinforcement strips 50 may be made from a reinforcement member 35 and an overlay 40 (See FIGS. 1-4). In another embodiment, an elongated reinforcement strip 50 may be made from a reinforcement member 35 and a folded edge 28 of an elongated base sheet 20. In still another embodiment, an elongated reinforcement strip 50 may be made from a reinforcement member 35, an overlay 40 and a folded edge 28 of an elongated base sheet 20. Each of the reinforcement members 35 may be a cord-like, elongated reinforcement member 35 attached to the elongated base sheet 20 and may extend along the longitudinal axis of the elongated base sheet 20. The cord-like reinforcement members 35 may be attached to the base sheet 20 by any means, including, but not limited to, by a plurality of glue bead lines, by static charge, sonic weld or other like holding means. In one embodiment, each of the plurality of cord-like, elongated reinforcement members 35 may be randomly compressed base plastic film strips 32. These base plastic film strips 32 may preferably be flat, narrow plastic film strips that are easily compressed. Each of the overlays 40 may be narrow plastic film strip overlays positioned over the cord-like, elongated reinforcement members 35 thereof. The narrow plastic film strip overlays 40 may be attached to the cord-like, elongated reinforcement members 35 and to the elongated base sheet 20 at opposed sides of the cord-like, elongated reinforcement member 35 to fixedly sandwich the cord-like, elongated reinforcement member 35 between the elongated base sheet 20 and narrow plastic film strip overlay 40. In one embodiment, the base sheet 20 may be completely uncovered in the elongated spaces therebetween 52 the parallel, elongated reinforcement strips 50. The reinforcement strips 50 may be spaced from one another and parallel. In one embodiment of the instant invention, the reinforcement strips 50 are spaced parallel to one another, extending along the longitudinal axis of the elongated base sheet 20 wherein one edge of one overlay 40 substantially butts up against one edge of an adjacent overlay 40, leaving no elongated space 52 between overlays. In another embodiment, the reinforcement strips 50 are spaced parallel to one another, extending along the longitudinal axis of the elongated base sheet 20 wherein the edges of each overlay 40 do not come into contact with one another, resulting in an elongated space 52 between each adjacent overlay 40. In yet another embodiment, the reinforcement strips 50 are spaced parallel to one another, extending along the longitudinal axis of the elongated base sheet 20 wherein the edge of one overlay 40 overlaps the edge of an adjacent overlay 40, resulting in no space between each adjacent overlay 40 and additional reinforcement. In still another embodiment, the edges of adjacent overlays 40 may substantially butt up against one another, overlap one another, not come into contact with one another (resulting in an elongated space 52 between adjacent overlays 40), or a combination thereof.

The instant invention further includes an additional reinforcement element mentioned previously and now described in more detail. An elongated base sheet 20, as mentioned above includes a longitudinal axis and be made of any suitable material for a stretch film, including any suitable plastic stretch films. An elongated base sheet 20 also includes a pair of edges 25 running parallel to the longitudinal axis and located on each side of the base sheet 20. After one or more elongated reinforcement members 35 are attached to the elongated base sheet 20, extending along the longitudinal axis of the elongated base sheet 20, one or both of the edges 25 of the elongated base sheet may be folded over leaving a folded edge 28 on one or both sides of the elongated base sheet 20. The edges 25 may be folded either prior to or after one or more overlays 40 are attached to the cord-like, elongated reinforcement members 35 and to the elongated base sheet 20 at opposed sides of the cord-like, elongated reinforcement member 35 to fixedly sandwich the cord-like, elongated reinforcement member 35 between the elongated base sheet 20 and narrow plastic film strip overlay 40 resulting in additional reinforcement of each folded edge 28.

The folded edges 28 and the reinforcement strips 50 of the elongated base sheet 20 may be attached to the base sheet 20 by any means. See FIGS. 1-2. In one embodiment, folded edges 28 and the narrow plastic film strip overlays 40 may be attached to the cord-like, elongated reinforcement members 35 and to the elongated base sheet 20 by a bond. This bond may be any bond, including, but not limited to: a static electric hold of the folded edges 28 and the plastic film strip overlays 40 to the cord-like, elongated reinforcement members 35 and to the elongated base sheet 20; a lamination bond of the folded edges 28 and the plastic film strip overlays 40 to the cord-like, elongated reinforcement members 35 and to the elongated base sheet 20; a static weld of the folded edges 28 and the plastic film strip overlays 40 to the cord-like, elongated reinforcement member 35 and the elongated base sheet 20; and/or an ultrasonic weld of the folded edges 28 and the plastic film strip overlays 40 to the cord-like, elongated reinforcement members 35 and to the elongated base sheet 20. In one embodiment, the bond holding the folded edges 28 and/or the reinforcement strips 50 to the base sheet 20 may be the combination of a static electric hold of the plastic film strip overlays 40 to the cord-like, elongated reinforcement members 35 and to the elongated base sheet 20, a lamination bond of the folded edges 28 and the plastic film strip overlays 40 to the cord-like, elongated reinforcement members 35 and to the elongated base sheet 20; and an ultrasonic weld of the folded edges 28 and the plastic film strip overlays 40 to the cord-like, elongated reinforcement members 35 and to the elongated base sheet 20. In another embodiment, the reinforcement strips 50 may be attached to the base sheet 20 by first holding the overlays 40 onto the base sheet 20 and reinforcement members 35 with a static charge, then laminating the film strip overlays 40 and/or the folded edges 28 to the base sheet 20 and reinforcement members 35, and finally sealing the film strip overlays 40 and/or the folded edges 28 to the base sheet 20 with double lamination process of both static welding and sonic welding.

One embodiment of the instant invention discloses a reinforced stretch film 10 comprising an elongated base sheet 20 of plastic stretch film having a longitudinal axis; and a plurality of elongated reinforcement strips 50 extending along the longitudinal axis of the elongated base sheet 20, disposed substantially parallel to one another, and defining elongated spaces 52 therebetween, each elongated reinforcement strip 50 comprising a cord-like, elongated reinforcement member 35 made from a sheet of plastic stretch film other than the elongated base sheet 20 attached to the elongated base sheet 20 and extending along the longitudinal axis of the elongated base sheet and a narrow plastic film strip overlay 40 made from a sheet of plastic stretch film other than the elongated base sheet 20 positioned over the cord-like, elongated reinforcement members 35, where, the narrow plastic film strip overlays 40 are attached to the cord-like, elongated reinforcement members 35 and to the elongated base sheet 20 at opposed sides of the cord-like, elongated reinforcement members 35 to fixedly sandwich the cord-like, elongated reinforcement members 35 between the elongated base sheet 20 and narrow plastic film strip overlays 40, where each edge 25 of the elongated base sheet 20 of plastic stretch film is folded inward, and over at least one cord-like, elongated reinforcement member 35 creating a folded edge 28 to further strengthen and reinforce each edge, where, each edge 25 of the elongated base sheet 40 is attached to the cord-like, elongated reinforcement members 35 and to the elongated base sheet 20 to fixedly sandwich the cord-like, elongated reinforcement members 35 between the elongated base sheet 20 and folded edge 28 and wherein the stretch percent of the reinforced stretch film 10 is increased over the stretch percent of the elongated base sheet 20 of plastic stretch film.

In one embodiment of the instant invention, the plurality of cord-like, elongated reinforcement members 35 are a randomly compressed flat, narrow plastic film strips 32 and spaced from one another and parallel. In another embodiment of the instant invention, the base sheet 20 is uncovered in the elongated spaces 52 between the parallel, elongated reinforcement strips 50 defined by the narrow plastic film strip overlays 40, the folded edges 28 and the cord-like, elongated reinforcement members 35. In still another embodiment, the reinforced stretch film 10 may further comprise a plurality of glue bead lines for attaching the cord-like, reinforcement members 35 to the base sheet 20. In still another embodiment, the narrow plastic film strip overlay 40 and each of the edges 25 are attached to the cord-like, elongated reinforcement member 35 and to the elongated base sheet 20 by a bond which is a lamination bond of the plastic film strip overlays 40 and/or the folded edges 28 to the cord-like, elongated reinforcement members 35 and to the elongated base sheet 20 and a static electric seal of the plastic film strip overlays 40 and/or the folded edges 28 to the cord-like, elongated reinforcement members 35 and to the elongated base sheet 20. In yet another embodiment, the stretch percent of the reinforced film 10 is increased over the stretch percent of the elongated base sheet 20 of plastic stretch film by up to 400 percent.

The above embodiments may further include a reinforced stretch film 10 further comprising a plurality of slits through the elongated base sheet 20, the reinforcement strips 50, the folded edges 28, or a combination thereof, which expand into holes when stretched making the reinforced stretch film ventilated. The above embodiments may further include pre-stretching the reinforced stretch film 10, the elongated base sheet 20, the master material 30 the reinforcement member(s) 35, the overlay(s) 40, the reinforcement strip(s) 50, or a combination thereof. Pre-stretching may be achieved by any means known in the art. In one embodiment of the above method, the pre-stretching may be achieved by passing the above materials through a device in which the level of pre-stretch is adjusted by altering the transmission ratio of two or more power transmission gears operationally associated with a first pre-stretching roller and a second pre-stretching roller, wherein the level of pre-stretch is achieved by passing the materials over the rollers while set at a desired gear ratio.

Figure 1:
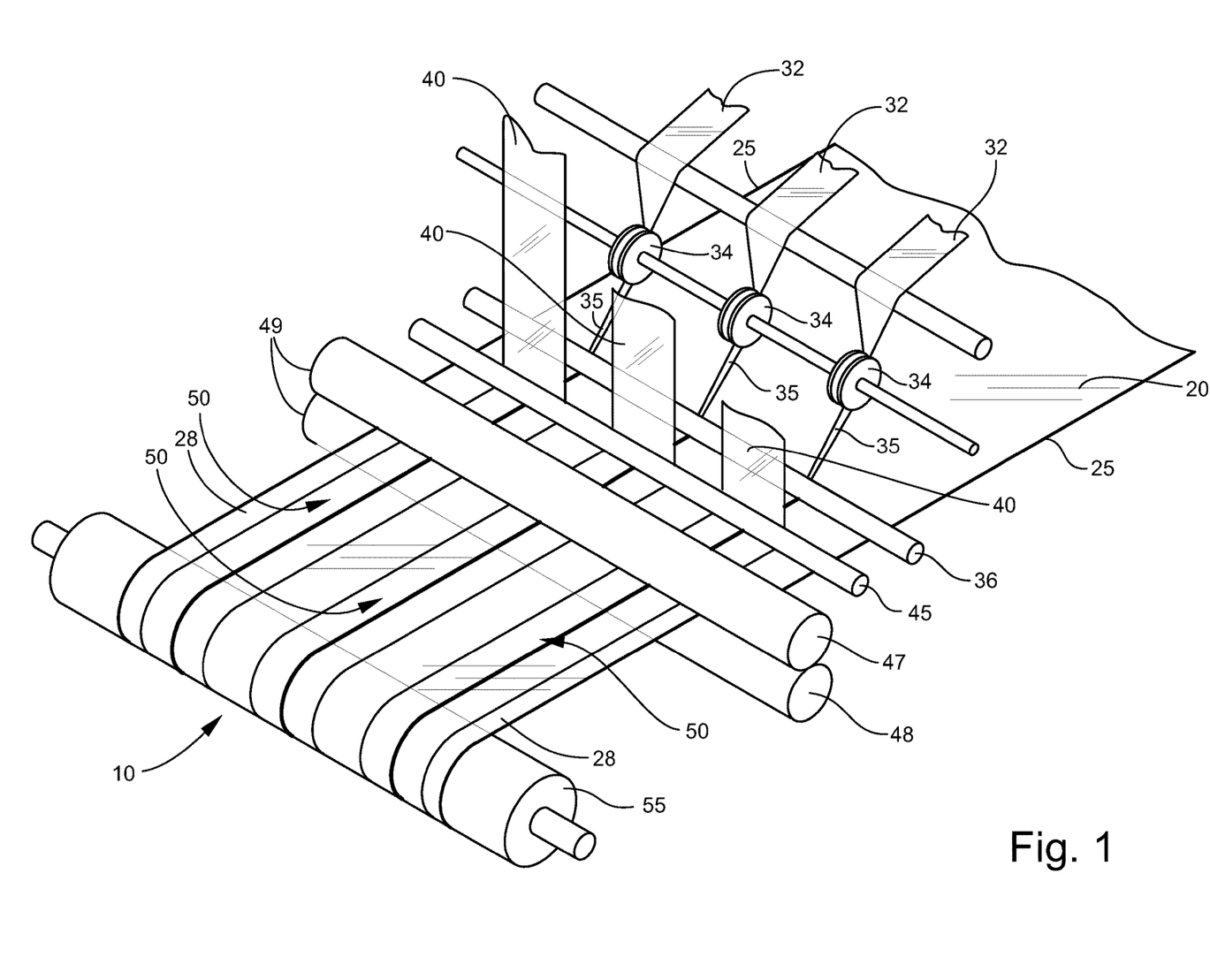
Figure 2:
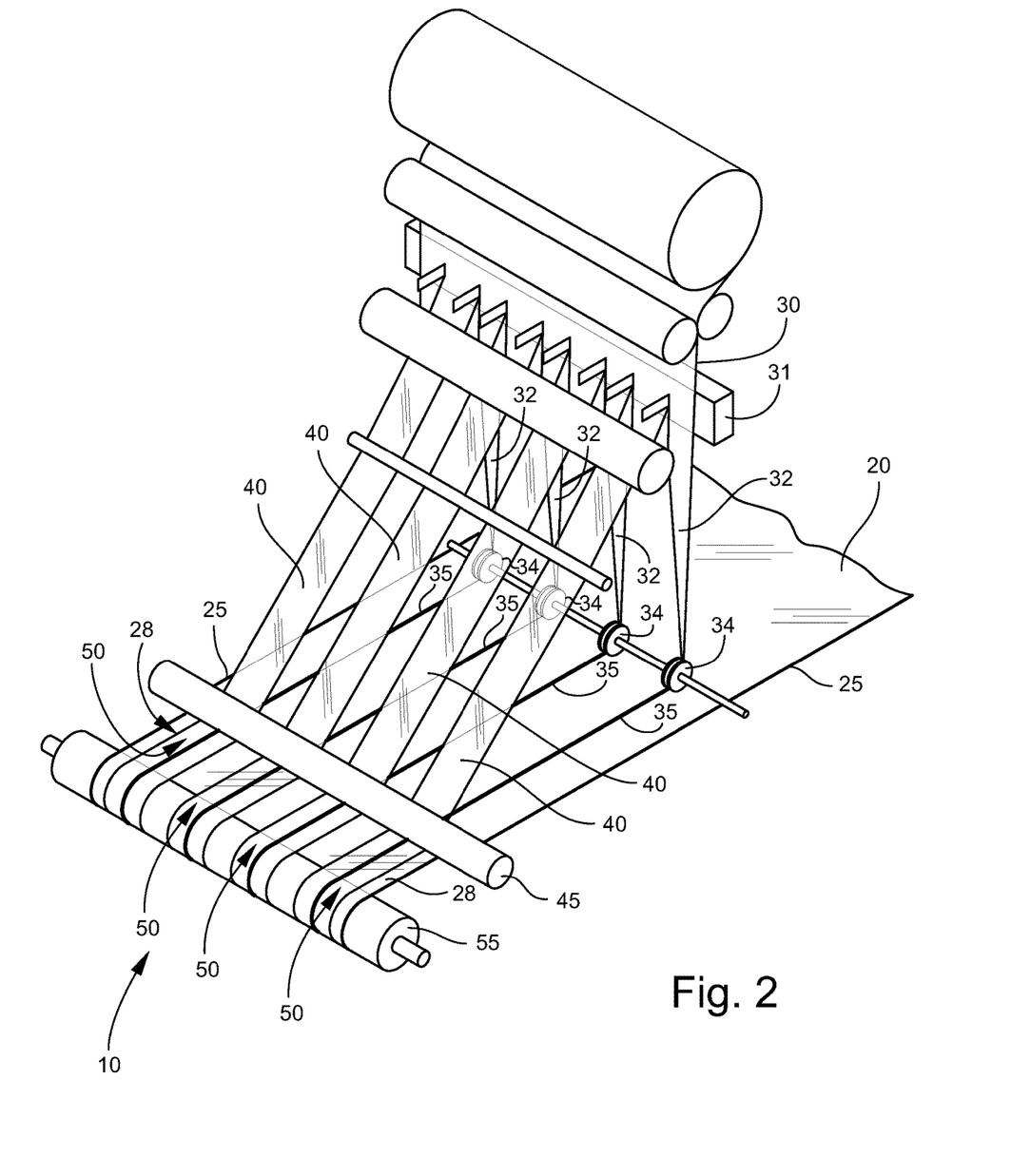

Referring to FIGS. 1-2, various embodiments of methods for producing the reinforced stretch film 10 are shown. In general, the method of producing the reinforced stretch film include the steps of:
  a) providing an elongated base sheet 20 of plastic stretch film having a longitudinal axis;
  b) forming a plurality of cord-like, elongated reinforcement members 35 from a sheet of plastic stretch film other than the elongated base sheet 20;
  c) forming a plurality of plastic film strip overlays from a sheet of plastic stretch film other than the elongated base sheet;
  d) positioning the plurality of cord-like, elongated reinforcement members 35 on the elongated base sheet 20 where the cord-like, elongated reinforcement members 35 extend along the longitudinal axis of the elongated base sheet 20;
  e) positioning the plurality of the plastic film strip overlays 40 over each of the cord-like, elongated reinforcement members 35 where the plastic film strip overlays 40 may be parallel and spaced from one another;
  f) folding each edge 25 of the elongated base sheet 20 of plastic stretch film inward toward a center of the elongated base sheet creating a folded edge 28 to further strengthen and reinforce each edge/side; and
  g) attaching the plastic film strip overlays 40 and/or the folded edges 28 to the cord-like, elongated reinforcement members 35 and to the elongated base sheet 20 to fixedly sandwich the cord-like, elongated reinforcement members 35 between the elongated base sheet 20 and the narrow plastic film strip overlays 40, whereby, the narrow plastic film strip overlays 40 and the cord-like, elongated reinforcement members 35 may comprise parallel, elongated reinforcement strips 50 which may define elongated spaces 52 therebetween.

In one embodiment, the base sheet 20 may be produced where the spaces 52 defined between the reinforcement strips are completely uncovered.

The method of producing reinforced stretch film 10 may include a step of forming a plurality of cord-like, elongated reinforcement members 35 (See FIGS. 1-2). The plurality of cord-like, elongated reinforcement members 35 may include any steps prior to or during the assembly of reinforced stretch material 10 for creating such cord-like elongated reinforcement members 35. In one embodiment, the step of forming the plurality of cord-like, elongated reinforcement members 35 may include randomly compressing a plurality of base plastic film strips 32, which may preferably be flat and narrow, by randomly compressing each of the base plastic film strips 32. This random compression may be done by any random compression means. In one embodiment, the base plastic film strips 32 may be randomly compressed to form cord-like reinforcement members 35 by rotating a collector roll 34. In another embodiment, the base plastic film strips 32 may be randomly compressed to form cord-like reinforcement members 35 by employing a compressor type nozzle (not illustrated) during transport thereof. In yet another embodiment, both collector rolls 34 and compressor type nozzles may be desired.

Referring specifically to FIG. 2, in one embodiment the plurality of cord-like, elongated reinforcement members 35 and the plurality of plastic film strip overlays 40 may be formed from a master material 30. The master material 30 may be any suitable stretch film material, including but not limited to, any plastic stretch film material. In one embodiment, the master material 30 may be a polyethylene material, like a linear low-density polyethylene material (LLDP). In the embodiment shown in FIG. 2, the master material 30 may be cut or slit to create the base plastic film strips 32 used for forming the elongated, cord-like reinforcement members 35, and the plastic film strip overlays 40. The master material 30 may be cut or slit, by any means, including, but not limited to, a slitter unit 31 to provide the base film strips 32 of the plurality of cord-like, elongated reinforcement members 35, and the plurality of plastic film strip overlays 40. In this embodiment, the base film strips 32 of the plurality of cord-like reinforcement members 35 and the plurality of film strip overlays 40 are made from the same material and may be the same width. For example, in one embodiment, the master material 30 may be slit by slitter unit 31 at evenly spaced distances to provide base plastic film strips 32 of the plurality of cord-like, elongated reinforcement members 35 and the plurality of plastic film strip overlays 40 of equal widths. However, the widths of the film strips need not be identical and various desired widths of both the base film strips 32 and overlays 40 may be cut or slit out of the master material 30.

Referring back to FIG. 1, in one embodiment the plurality of cord-like, elongated reinforcement members 35 and the plurality of plastic film strip overlays 40 may be formed separately prior to the production of reinforced stretch film 10. In this embodiment, the reinforcement members 35 and overlays 40 may be provided in various suitable stretch film material, including but not limited to, various plastic stretch film material, including various LLDPs.

A step of positioning the plurality of cord-like, elongated reinforcement members 35 to the elongated base sheet 20 may be included in the method of producing the reinforced stretch film 10. The step of positioning the reinforcement members 35 may include any steps for positioning the reinforcement members on base sheet 20. In one embodiment, this step may include attaching the plurality of cord-like, elongated reinforcement members 35 to the elongated base sheet 20, where the cord-like, elongated reinforcement members 35 may be spaced from one another and disposed substantially parallel to one another. In another embodiment, the step of positioning the plurality of cord-like, elongated reinforcement members 35 on the elongated base sheet 20 may include attaching the plurality of cord-like, elongated reinforcement members 35 to the elongated base sheet 20 via a line of adhesive beads, sonic weld, and/or a static charge.

A step of attaching the plastic film strip overlays 40 and/or the folded edges 28 to the cord-like reinforcement members 35 and base sheet 20 may be included in the method of producing the reinforced stretch film 10. This step of attaching the overlays 40 to the reinforcement members 35 and base sheet 20 may include any steps for attaching the overlays 40. In one embodiment, this step may include: a step of holding the plastic film strip overlays 40 and/or the folded edges 28 onto the cord-like, elongated reinforcement members 35 and to the elongated base sheet 20 via static electricity; a step of laminating the plastic film strip overlays 40 and/or the folded edges 28 to the cord-like, elongated reinforcement members 35 and to the elongated base sheet 20; a step of sealing the plastic film strip overlays 40 and/or the folded edges 28 to the cord-like, elongated reinforcement members 35 and to the elongated base sheet 20 via a sonic welder; or combinations thereof. In one embodiment, the step of attaching the overlays 40 and/or the folded edges 28 to the reinforcement members 35 and base sheet 20 may include a combination of: a step of holding the plastic film strip overlays 40 and/or the folded edges 28 onto the cord-like, elongated reinforcement members 35 and to the elongated base sheet 20 via static electricity; a step of laminating the plastic film strip overlays 40 and/or the folded edges 28 to the cord-like, elongated reinforcement members 35 and to the elongated base sheet 20; and a step of sealing the plastic film strip overlays 40 and/or the folded edges 28 to the cord-like, elongated reinforcement members 35 and to the elongated base sheet 20 via a sonic welder.

FIGS. 1 and 2 show a base sheet of stretch film 20, which may for example suitably be polyethylene stretch film or other like stretch film material, being unrolled from a roll of the film and conveyed toward the left as viewed in FIGS. 1 and 2. Disposed over the base sheet 20 may be a guide roller for guiding the roll of stretch film into the process. First plastic film strips 32, which may also be formed of polyethylene or other suitable material may be conveyed over a guide roller and downwardly to rotating collector rolls 34. First plastic film strips 32 may be flat and narrow. In one embodiment, the first plastic film strips 32 may be made from linear low-density polyethylene, also known as LLDP. The first film strips 32 may be partially compressed in random fashion by collector rolls 34. In one embodiment, each of the randomly compressed first strips 32 may then be introduced into a compressor nozzle, or other similar device, for further random compression and possible twisting. The first film strips 32 may emerge from rotating collector rolls 34 as cord-like, elongated reinforcement members 35. In one embodiment, reinforcement members 35 may be pushed against the upper surface of base sheet 20 by a first idler roll 36. In one embodiment, reinforcement members 35 may be attached to the upper surface of base sheet 20. Cord-like, reinforcement members 35 may be attached to the upper surface of base sheet 20 by any means. For example, in one embodiment, reinforcement members 35 may be attached to the upper surface of base sheet 20 by a line of adhesive or glue beads, by sonic weld, or by a static charge.

Immediately thereafter, plastic film strip overlays 40, which also may be polyethylene or other like material, may be applied to the base sheet 20. Plastic film strip overlays 40 may be flat and narrow. In one embodiment, the plastic film strip overlays 40 may be made from linear low-density polyethylene, also known as LLDP. In one embodiment, plastic film strip overlays 40 may be similar to base plastic film strips 32, including, being cut from the same master material 30. The plastic film strip overlays 40 may be laid over to thereby cover the cord-like reinforcement members 35. The film strip overlays 40 may be on and in engagement with the elongated base sheet 20 on opposed sides of the reinforcement members 35. In one embodiment, a second idler roll 45 may be employed for such purpose and may also establish a firm interconnection between the base sheet 20, the reinforcement members 35, and the narrow film strip overlays 40. In another embodiment, one or more press rollers 47, 48 may be employed to establish a firm interconnection between the base sheet 20, the reinforcement members 35, and the narrow film strip overlays 40.

Immediately prior to, during, or immediately after the plastic film strip overlays 40, are applied to the base sheet 20 as described above, the edges 25 of the base sheet 20 are folded over in the manner described previously creating one or two folded edges 28. The folded edges 28 may be flat and narrow. The plastic film strip overlays 40 may be laid over to thereby cover the cord-like reinforcement members 35. The folded edges 28 may be on and in engagement with the elongated base sheet 20 on opposed sides of the reinforcement members 35. In one embodiment, a second idler roll 45 may be employed for such purpose and may also establish a firm interconnection between the base sheet 20, the reinforcement members 35, and the folded edges 28. In another embodiment, one or more press rollers 47, 48 may be employed to establish a firm interconnection between the base sheet 20, the reinforcement members 35, and the folded edges 28.

The reinforcement members 35, the folded edges 28 and/or the film strip overlays 40 may form any number of elongated reinforcement strips 50 on base sheet 20. In one embodiment, the reinforcement members 35, the folded edges 28 and/or the film strip overlays 40 may form three elongated reinforcement strips 50. In another embodiment, the reinforcement members 35, the folded edges 28 and/or the film strip overlays 40 may form five elongated reinforcement strips 50, as shown in the arrangement illustrated in FIG. 1. In another embodiment, the reinforcement members 35, the folded edges 28 and/or the film strip overlays 40 may form four elongated reinforcement strips 30, as shown in the arrangement illustrated in FIG. 2. In other embodiments, the reinforcement members 35, the folded edges 28 and/or the film strip overlays 40 may form more than four elongated reinforcement strips 50, including, but not limited to 6, 8, 12 or 16 elongated reinforcement strips 50, or any other desired number of reinforcement strips 50. The reinforcement strips 50 may be attached to the base stretch film 20 by any suitable means, including, but not limited to, lamination, static charge, adhesive or heat bonding, sonic welding, static weld, the like, combinations thereof, etc. In one embodiment, the reinforcement strips 50 may be attached to the base sheet 20 by first holding the overlays 40 onto the base sheet 20 and reinforcement members 35 with a static charge, then laminating the film strip overlays 40 and/or the folded edges 28 to the base sheet 20 and reinforcement members 35, and finally sealing the film strip overlays 40 and/or the folded edges 28 to the base sheet 20 with a sonic welder. In another embodiment, the reinforcement strips 50 may be attached to the base sheet 20 by first holding the overlays 40 onto the base sheet 20 and reinforcement members 35 with a static charge, then laminating the film strip overlays 40 and/or the folded edges 28 to the base sheet 20 and reinforcement members 35, and finally sealing the film strip overlays 40 and/or the folded edges 28 to the base sheet 20 with double lamination process of both static welding and sonic welding. The reinforcement strips 50 may be spaced from one another and extend along the longitudinal axis of the elongated base sheet 20. In one embodiment, the reinforcement strips 50 may be parallel to each other and define spaces 52 therebetween.

The above method may further include the step of passing the reinforced stretch film 10 over a device which cuts a plurality of slits through the elongated base sheet 20, the reinforcement strips 50, the folded edges 28, or a combination thereof, which expand into holes when stretched making the reinforced stretch film ventilated. The plurality of slits may be made by any device known in the art. In another embodiment, the above method may further include pre-stretching the reinforced stretch film 10, the elongated base sheet 20, the master material 30 the reinforcement member(s) 35, the overlay(s) 40, the reinforcement strip(s) 50, or a combination thereof. Pre-stretching may be achieved by any means known in the art. In one embodiment of the above method, the pre-stretching may be achieved by passing the above materials through a device in which the level of pre-stretch is adjusted by altering the transmission ratio of two or more power transmission gears operationally associated with a first pre-stretching roller and a second pre-stretching roller, wherein the level of pre-stretch is achieved by passing the materials over the rollers while set at a desired gear ratio.

Figure 3:
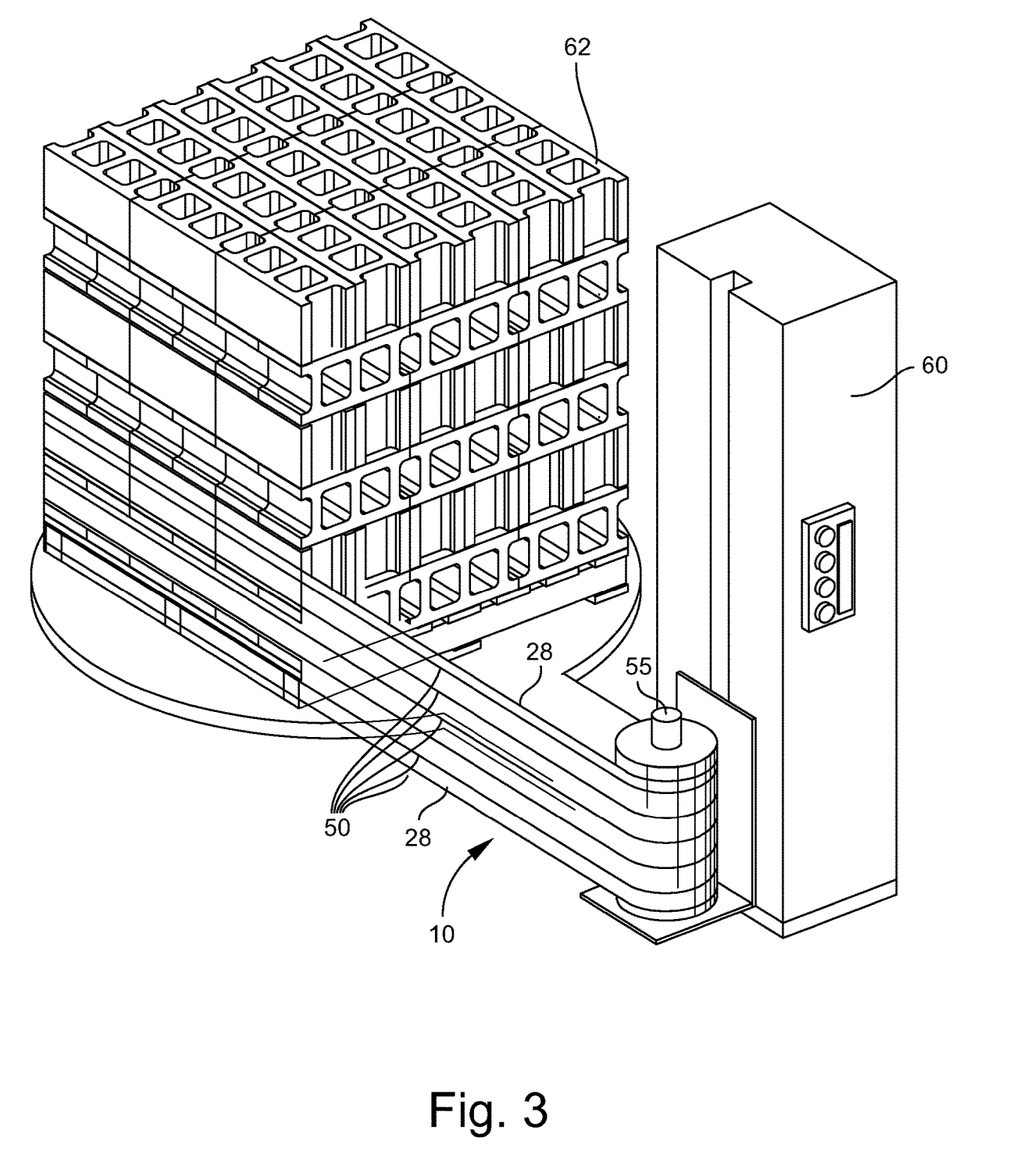
Figure 4:
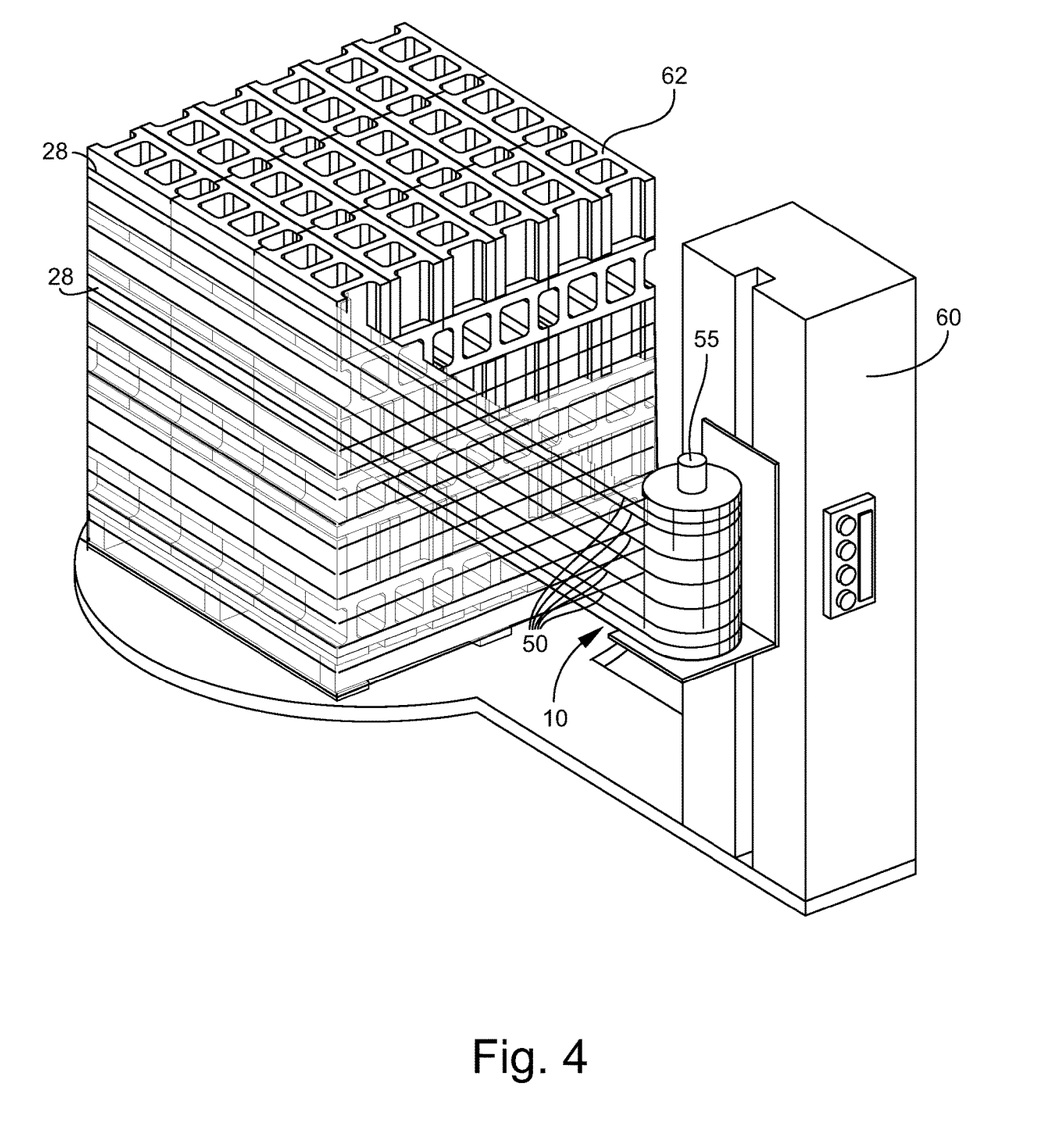

FIGS. 3 and 4 illustrate a roll 55 of the reinforced stretch film 10 being held by a conventional stretch film wrapping machine 60 which may, for example, be a suitable model of stretch film wrapping machine made by Lantech of Louisvile, Ky. The stretch film wrapping machine 60 may wrap the reinforced stretch film 10 of the present invention about a pallet load 62.

The reinforced stretch film 10 may provide an increase in the stretch percent over the stretch percent of just providing elongated base sheet of plastic stretch film. In one embodiment, the reinforced stretch film may provide an increase in the stretch percent over the stretch percent of just providing elongated base sheet of plastic stretch film by up to 400 percent. In another embodiment of the present invention, the reinforced stretch film may provide an increase in the stretch percent over the stretch percent of just providing elongated base sheet of plastic stretch film by between 150 and 400 percent. In still another embodiment of the present invention, the reinforced stretch film may provide an increase in the stretch percent over the stretch percent of just providing elongated base sheet of plastic stretch film by between 250 and 400 percent. In yet another embodiment of the present invention, the reinforced stretch film may provide an increase in the stretch percent over the stretch percent of just providing elongated base sheet of plastic stretch film by between 300 and 400 percent.

Any method described herein may incorporate any design element contained within this application and any other document/application incorporated by reference herein. Any design element contained within this application may be incorporated into any embodiment contained within this application.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

We claim:

1. A method of producing a reinforced stretch film comprising the steps of:
    providing an elongated base sheet of plastic stretch film having a longitudinal axis;
    forming a plurality of cord-like, elongated reinforcement members from a sheet of plastic stretch film other than the elongated base sheet;
    forming a plurality of plastic film strip overlays from a sheet of plastic stretch film other than the elongated base sheet;
    positioning the plurality of cord-like, elongated reinforcement members on the elongated base sheet where the cord-like, elongated reinforcement members extend along the longitudinal axis of the elongated base sheet;
    positioning the plurality of plastic film strip overlay over each of the cord-like, elongated reinforcement members where the plastic film strip overlays are parallel and spaced from one another;
    folding each edge of the elongated base sheet of plastic stretch film inward toward a center of the elongated base sheet creating a folded edge to further strengthen and reinforce each edge; and
    sandwiching the cord-like, elongated reinforcement members between the elongated base sheet, the plastic film strip overlays and/or the folded edges;

attaching the plastic film strip overlays and the folded edges to the cord-like, elongated reinforcement members and to the elongated base sheet by:
  holding the plastic film strip overlays and the folded edges onto the cord-like, elongated reinforcement members and to the elongated base sheet via static electricity;
  laminating the plastic film strip overlays and the folded edges to the cord-like, elongated reinforcement members and to the elongated base sheet; and
  sealing the plastic film strip overlays and the folded edges to the cord-like, elongated reinforcement members and to the elongated base sheet via a sonic welder;
whereby, the plastic film strip overlays and the cord-like, elongated reinforcement members define_elongated spaces therebetween.

2. The method of producing a reinforced stretch film of claim 1 wherein the step of forming a plurality of cord-like, elongated reinforcement members including randomly compressing a plurality of flat and narrow base plastic film strips by randomly compressing each of the flat and narrow, base plastic film strips by rotating a collector roll.

3. The method of producing a reinforced stretch film of claim 1 wherein the plurality of cord-like, elongated reinforcement members and the plurality of plastic film strip overlays are formed from a master material.

4. The method of producing a reinforced stretch film of claim 3 wherein the master material is slit by a slitter unit to provide base film strips of the plurality of cord-like, elongated reinforcement members, and the plurality of plastic film strip overlays.

5. The method of producing a reinforced stretch film of claim 3 wherein the master material is slit by a slitter unit at evenly spaced distances to provide base film strips of the plurality of cord-like, elongated reinforcement members and the plurality of plastic film strip overlays of equal widths.

6. The method of producing a reinforced stretch film of claim 1 wherein the step of positioning the plurality of cord-like, elongated reinforcement members to the elongated base sheet including attaching the plurality of cord-like, elongated reinforcement members to the elongated base sheet, where the cord-like, elongated reinforcement members are spaced from one another and disposed substantially parallel to one another.

7. The method of producing a reinforced stretch film of claim 6 wherein the step of positioning the plurality of cord-like, elongated reinforcement members to the elongated base sheet including attaching the plurality of cord-like, elongated reinforcement members to the elongated base sheet via a line of adhesive beads.

8. The method of producing a reinforced stretch film of claim 1 wherein the base sheet is uncovered in the elongated spaces therebetween each parallel, elongated reinforcement strip which includes a cord-like, elongated reinforcement member, a narrow plastic film strip overlay, and/or a folded edge.

9. The method of producing a reinforced stretch of claim 1 further comprising:
  transporting the elongated base sheet in a direction of movement corresponding to the longitudinal axis of the elongated base sheet;
  the step of forming a plurality of cord-like, elongated reinforcement members is completed simultaneously with the transport of the elongated base sheet;
  where each of the cord-like, elongated reinforcement members is made by simultaneously randomly compressing the plurality of transported plastic film strips by randomly compressing each of the plastic film strip by simultaneously rotating a collector roll and employing a compressor nozzle during transport thereof;
  the step of positioning the plurality of cord-like, elongated reinforcement members on the elongated base sheet being during transport of the elongated base sheet;
  the step of folding over each edge of the elongated based sheet being during the transport of the elongated base sheet;
  transporting the elongated base sheet and the cord-like, elongated reinforcement members attached thereto in the direction of movement to the longitudinal axis of the elongated base sheet; and
  the step of attaching the plastic film strip overlays and the folded edges to the cord-like, elongated reinforcement members and to the elongated base sheet being during transport of the elongated base sheet and the cord-like, elongated reinforcement members attached thereto.

* * * * *